Figure 1:
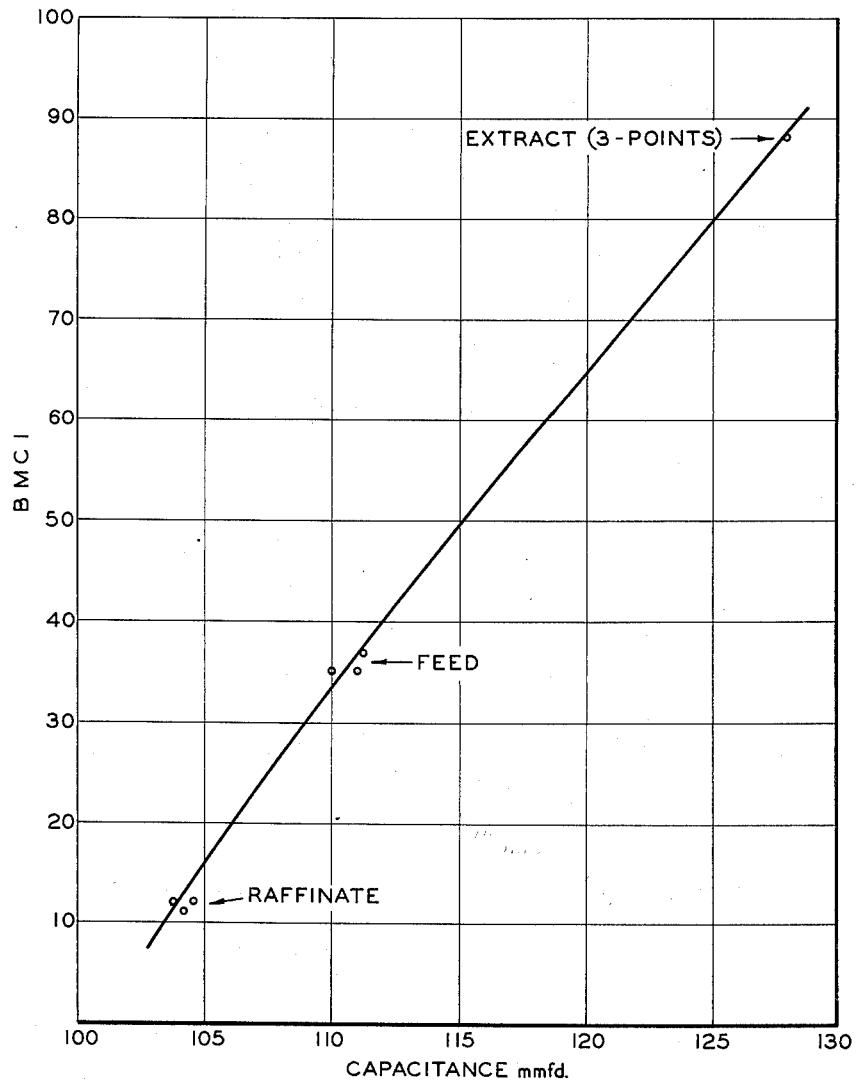

Nov. 7, 1961  W. D. PETERS  3,007,979
LIQUID-LIQUID EXTRACTION PROCESS AND APPARATUS
Filed Jan. 21, 1955  3 Sheets-Sheet 2

INVENTOR.
W. D. PETERS

BY *Hudson & Young*

ATTORNEYS

United States Patent Office 3,007,979
Patented Nov. 7, 1961

3,007,979
LIQUID-LIQUID EXTRACTION PROCESS
AND APPARATUS
William D. Peters, Bartlesville, Okla., assignor to Phillips Petroleum Company, a corporation of Delaware
Filed Jan. 21, 1955, Ser. No. 483,392
6 Claims. (Cl. 260—674)

This invention relates to an improved process and apparatus for liquid-liquid extraction. A specific aspect of the invention pertains to a process and apparatus for controlling a liquid-liquid extraction process as applied to a hydrocarbon fraction containing aromatics and nonaromatics to produce a product of predetermined Bureau of Mines Correlation Index (BMCI).

The extraction of hydrocarbon materials with liquid solvents is well known in the art as a means for concentrating the aromatic content of a hydrocarbon feedstock in an extraction product. In order to obtain a high degree of enrichment in the extract product it has been found necessary to closely control the temperature of the solvent utilized in the process. Low temperatures enhance the selectivity of the solvent for aromatic compounds particularly when using $SO_2$ as the solvent; but, when processing a heavy waxey oil, the process is aggravated by the settling out of wax crystals in the extraction zone when temperatures are reduced below the critical solution temperature of the material. For this reason the temperature of the process must be maintained within a range safely above the critical solution temperature and accordingly some oils can be enriched only to a limited degree by present relatively insensitive process control means because the temperature of the process must be maintained far above the critical solution temperature to preclude crystal formation in the tower or column.

One of the objects of the present invention is to provide an improved process and apparatus for effecting liquid-liquid extraction of a multi-component feed. Another object is to provide an improved process and apparatus which effects closer control of product quality in a liquid-liquid extraction operation. It is also an object of the invention to provide a method and means of effecting closer product control in the liquid-liquid extraction of a mixed aromatic and non-aromatic hydrocarbon fraction to produce an aromatic extract of predetermined Bureau of Mines Correlation Index or aromaticity, tailor-made for carbon black production. A further object is to provide an improved process and apparatus for liquid-liquid extraction which effects more accurate control of temperature in the extraction column and closer control on extract and/or raffinate compositions. Other objects of the invention will become apparent from a consideration of the accompanying disclosure.

Broadly speaking, the invention comprises measuring the capacitance of an aromatic-containing oil stream which may be the feed, extract, or raffinate stream in a liquid-liquid extraction process and regulating an operating variable in the process which affects the aromaticity of the product streams; and it also comprises an arrangement of apparatus for effecting the control of the product streams in this manner. The preferred embodiment of the invention comprises automatically measuring the capacitance of the extract product stream and controlling the temperature of the solvent stream introduced to the column so as to produce an extract product stream of predetermined relatively constant aromaticity as measured by the capacitance of the extract.

Carbon black feedstocks are evaluated and selected on the basis of their BMCI values which are a measure of their carbon black production capacity. The BMCI of a carbon black feedstock is calculated from the following expression:

$$BMCI = 100\left(\frac{875.52}{460+F} + \frac{670.28}{G+131.5} - 4.568\right)$$

wherein F=the average boiling point of the oil (50% point on ASTM distillation curve) G=API gravity of the oil at $$\frac{60}{60F}$$

This property relates to the carbon content of the oil and will, among other things, be dependent upon the aromaticity of the oil. I have found that the capacitance of the oil is related to the aromaticity and that there is a good correlation between the capacitance of the extract product from a liquid-liquid extraction process and the BMCI of the product. This correlation also exists between the capacitance and aromaticity of the feed and of the raffinate as shown on the curve for plotted data of FIGURE 1 of the drawing. There is also a good correlation between capacitance of an aromatic-containing oil stream and yield of carbon black as shown in FIGURE 2 of the drawing.

The BMCI of an oil correlates, within reasonable limits, with the yield of carbon black which can be obtained from the oil, however, the determination of BMCI involves two measurements, i.e., ASTM distillation and API gravity. If an assumed value for the 50 percent boiling point of the oil is used, only the API gravity is required and for control purposes this property is sometimes utilized as a rough check on product quality but final sale of the product is made on a complete analysis of a bulk sample; thus the extract product from a liquid-liquid extraction unit has been roughly checked for BMCI and the process has been manually monitored on this basis. Actual plant data from a refinery $SO_2$ extraction unit samples show conclusively that the capacitance data correlate very well with BMCI and that the capacitance value obtained is probably a better value than BMCI for instrumentation purposes because the capacitance is an actual physical property of the oil whereas the reliability of the ASTM distillation mid-boiling point and the API gravity may be open to question, particularly with the heavier and more viscous samples.

As a means for automatically and instantaneously controlling the product quality by monitoring the temperature of the extraction zone by way of temperature control of the solvent stream to the extraction column, the process and apparatus of the invention utilize a "Permitor" which has been developed by James R. Parsons and is thoroughly described by him in his copending U.S. Patent application, Serial No. 376,960, filed August 27, 1953, now U.S. Patent No. 2,904,751. This instrument which is shown diagrammatically in its simplest form in FIGURE 3 continuously and instantaneously determines the capacitance of the extract product and sets up electrical signals which are utilized to monitor a temperature controller on the solvent line leading to the extraction column.

While the novel control process of the present invention may be applied by one skilled in the art to many extraction processes wherein aromatics are separated by liquid-liquid extraction or by extractive distillation, it will be understood that for the sake of brevity the discussion of all of these applications, except in a general way, would unduly overburden the application. For that reason the discussion of these applications of the invention will be limited to controlling the various process variables related to a liquid sulfur dioxide extraction process.

The latter process can be operated either isothermally or with considerable temperature gradient in the extraction tower and either the raffinate or extract ends may be refluxed or both ends may be refluxed or neither end refluxed, depending on the desired products. The process may be operated with a constant composition feed stream or with reasonably wide variation in feed stream composition. The process may be controlled to obtain either a constant extract product composition or a constant raffinate composition with a variable feedstock or to obtain both raffinate and extract products within narrow composition specifications if a constant composition feedstock is charged to the process. Considerable versatility is possible with an existing tower although more desirable separations can be made in well-designed towers prepared for a specific application. The capacitance of either the feed, raffinate product or extract product may be measured and applied to control process variables.

In isothermal operation with solvent temperature fixed and with constant feed composition, increasing the temperature of extraction results in higher solubility and lower selectivity. Therefore, to increase the volume of extract product at the expense of aromaticity, the temperature of extraction is increased, i.e., either the feed or solvent or both feed and solvent temperatures are increased. To increase aromaticity of the extract product, the temperature can be lowered. If it is desirable to operate at the same temperature, similar results in extract product compositions can be accomplished by increasing the solvent to feed ratio to the column and by returning reflux to the extract end of the tower. Increased solvent-to-oil ratio or increased reflux results in more aromatic extract products.

Similar control of variables applies to operations wherein a temperature gradient is maintained across the extract tower. In this instance, with constant feed composition, increasing the temperature gradient across the tower at constant solvent-to-feed ratio results in greater volume of a less aromatic extract product and in a smaller volume of a less aromatic raffinate. If the temperature at the extract end is maintained constant, an increase in raffinate temperature, or where solvent is introduced to the raffinate end, an increase in solvent temperature results in greater solubility of the raffinate as well as increased solubility of the extract; thereby the initial distribution of hydrocarbon is less selective than in the case where a lower solvent temperature is utilized.

Figure 2:
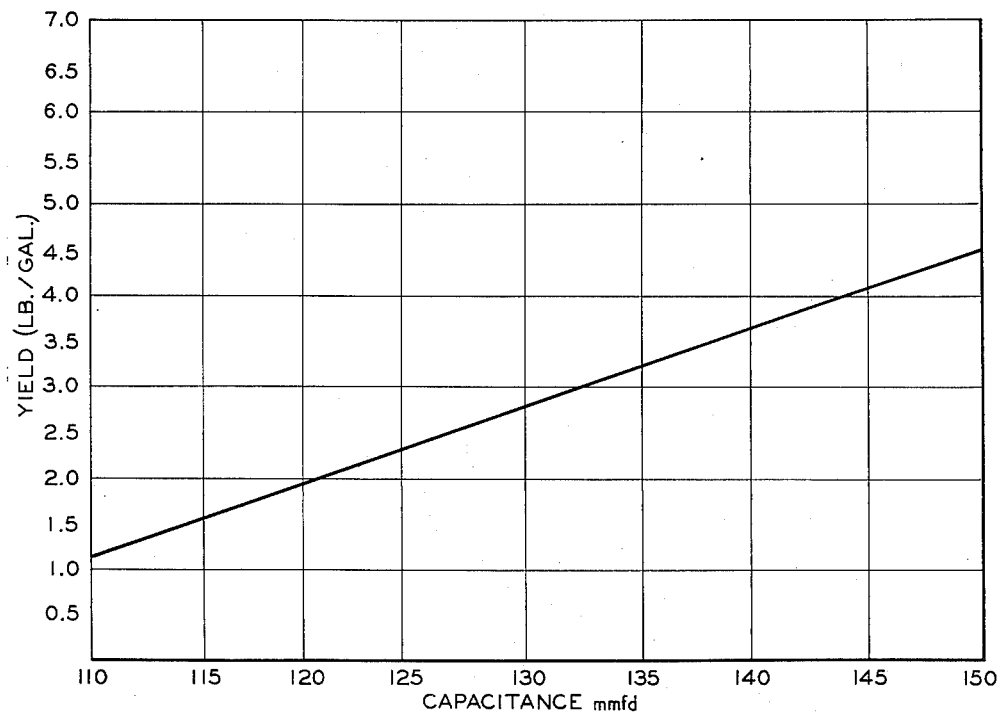
Figure 4:
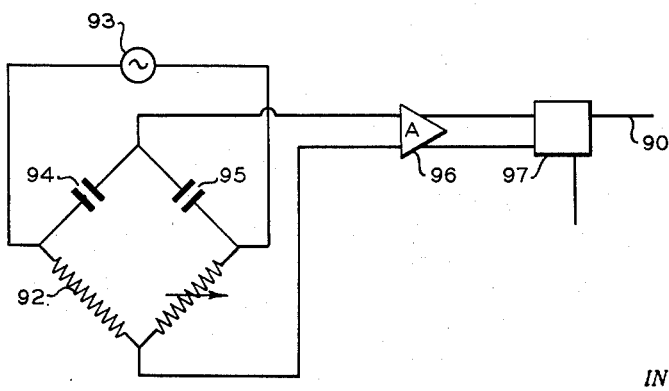
Figure 3:
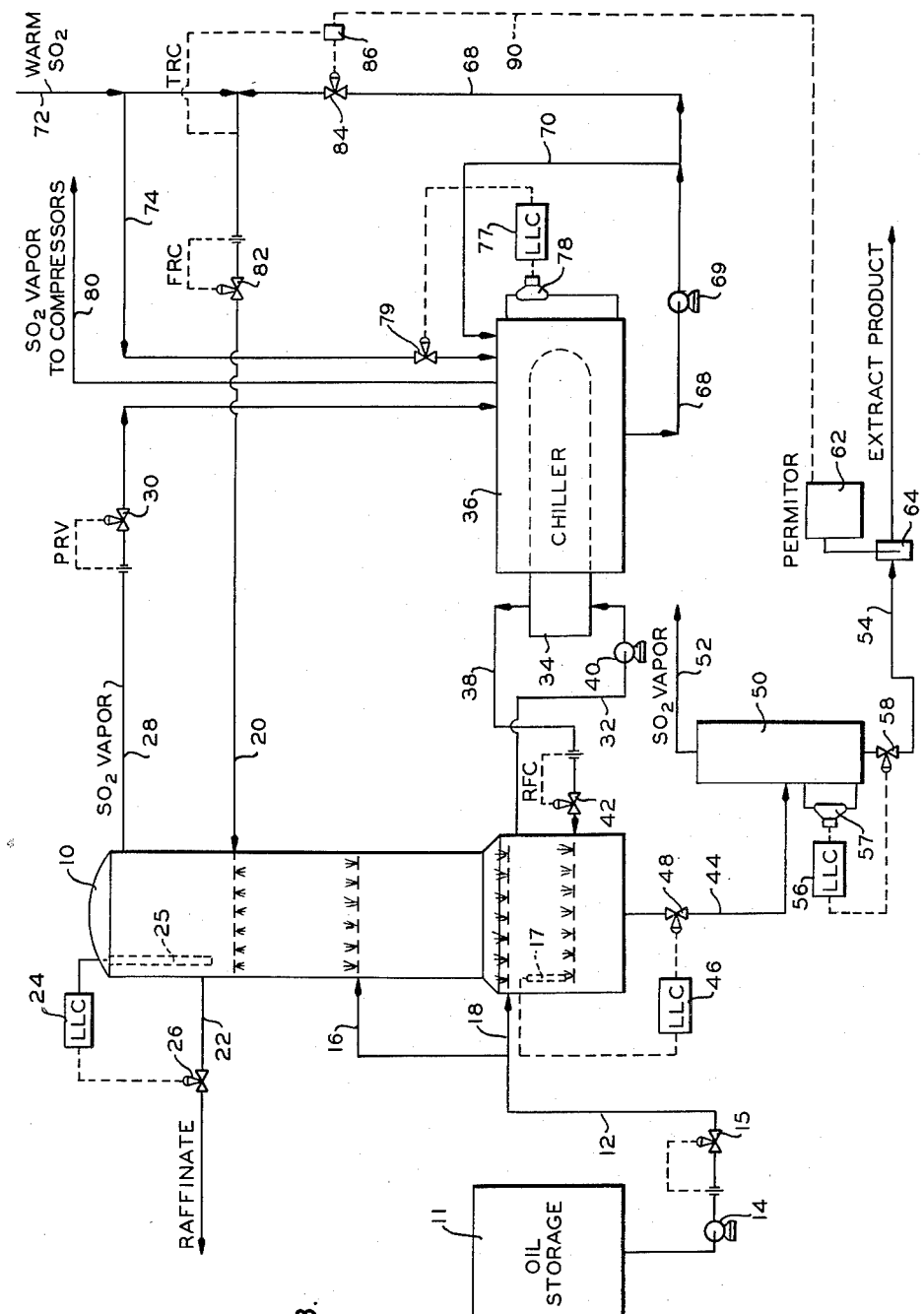

A more complete understanding of the invention may be had from a consideration of the drawings of which FIGURE 1 is a plotted curve showing the correlation between the capacitance of an aromatic-containing hydrocarbon stream and the BMCI value of the stream; FIGURE 2 is a plotted curve showing the correlation between capacitance and the yield of carbon black from a stream of any given capacitance; FIGURE 3 is a schematic arrangement of apparatus and flow in accordance with the invention; and FIGURE 4 is a diagrammatic showing of a "Permitor" or capacitance measuring device adapted for use in the invention.

FIGURES 1 and 2 are self-explanatory. The data utilized in plotting the curves were obtained in plant operation. It might be noted that the correlation between capacitance and BMCI and between capacitance and carbon black yield is applicable to hydrocarbon streams of a wide range of aromatic content so that the capacitance measuring instrument can be utilized on the feed stream and on raffinate stream, as well as on the extract product stream, as an effective measuring and control means.

Referring to FIGURE 3, tower 10 is a liquid-liquid extraction column of any conventional design which is suitable for liquid-liquid extraction of multi-component hydrocarbon feeds. Oil from storage tank 11 is passed thru line 12 by means of pump 14 under the control of a metering valve 15 and is passed into column 10 via line 16 and/or line 18. Solvent for the extraction step is introduced to column 10 by means of line 20 and a raffinate stream is withdrawn from the column by means of line 22 under the control of liquid-level indicating controller 24 which communicates with liquid-level sensing device 25 and regulates flow control valve 26 so as to maintain a suitable liquid level in the upper section of column 10 above raffinate line 22. Line 28 is an $SO_2$ vapor effluent line which bleeds off $SO_2$ under the control of pressure-relief valve 30 which is set for any suitable pressure operation in the column. Line 32 connects the lower section of column 10 with chiller coils 34 of chiller 36 and return line 38 connects the opposite end of the chiller coils with a lower point in the column. Liquid is pumped by means of pump 40 thru the chiller coils at a rate determined by recording-flow-controller 42 in line 38, thereby cooling the extract phase in the lower section of column 10 so as to release less soluble components therefrom and enrich the extract phase in aromatics.

Extract-rich solvent, usually termed the extract phase, is withdrawn from the lowermost section of column 10 by means of line 44 under the control of liquid level indicating controller 46 which is connected with liquid level sensing device 47 and regulates flow control valve 48 so as to withdraw extract at a rate sufficient to maintain the desired interface level between the rich extract phase and the lean solvent phase in a column. Line 44 connects with an intermediate section of a vaporizing or stripping tower 50 from which the $SO_2$ is recovered in vapor form thru effluent line 52. Substantially solvent-free extract is removed from the column 50 by means of line 54 under the control of liquid-indicating-controller 56 which communicates with a liquid-level sensing device 57 in communication with the lower section of column 50 and controls flow-control valve 58 so as to maintain a suitable liquid level in the stripping column.

A capacitance measuring instrument, or "Permitor," 62 is activated by a sensitive probe 64 in line 54 and emits electrical signals in proportion to the capacitance of the stream flowing thru this line. Chiller 36 is operated by vaporization of liquid $SO_2$ so as to maintain the liquid in the chiller at a temperature substantially below the desired minimum operating temperature of column 10. Relatively cold or cool $SO_2$ liquid is pumped thru line 68 by means of pump 69 to line 20 where it joins the mixed solvent stream therein. Line 70 carries recycle solvent from pump 64 back into the chiller. Cold solvent from line 68 is mixed with warm solvent passed from the compressors, not shown, to line 20 thru line 26. A portion of the warm $SO_2$ liquid in line 21 is passed via line 74 as feed into chiller 36. Liquid-level-indicating controller 77 is responsive to liquid level-sensing device 78 and regulates flow control valve 79 so as to maintain a suitable level of liquid $SO_2$ in the chiller. $SO_2$ vaporized in chiller 36 is passed via line 80 to compressors for compression and the resulting liquid is returned to the system via line 72.

A flow rate controller 82 in line 20 regulates the flow of mixed solvent to column 10 at a predetermined selected rate commensurate with the desired operation of the column. The temperature of this mixed solvent stream is regulated by varying the flow of cold solvent in line 68 by operation of valve 84. Valve 84 is controlled within relatively narrow limits by a temperature-recorder-controller 86 which is sensitive to temperatures in line 20 and is in actuating communication with valve 84. When temperature requirements of the process, as indicated by the capacitance-measuring instrument 62, require temperature changes in the mixed solvent line 20 outside of the set control range of instrument 86, the necessary regulation of the temperature in line 20 is made by "Permitor" 62 thru connecting line 90 with controller 86. In effect instrument 62 is an over-control instrument for temperature-recorder-controller 86.

It is also feasible to utilize instrument 62 to determine the capacitance of the extract product stream and manually operate temperature-control valve 84 so as to maintain the desired temperature in the mixed solvent stream in line 20. Although it is not preferred, it is feasible to place instrument 62 in raffinate line 22 and maintain the required temperature control in the mixed solvent line to produce a raffinate of predetermined aromatic character and thereby indirectly control the aromatic content of the extract product stream in line 54. In another embodiment of the invention, instrument 62 may be positioned in line 12 so as to determine the capacitance or aromatic content of the feed and regulate the depth of the extraction by regulating the temperature conditions in the column or by regulating the ratio of solvent to feed. It is also possible to utilize a "Permitor" 62 on each of the extract, raffinate, and feed lines to determine the aromatic content of the streams in these lines at all times or intermittently and regulate any of the known operating variables in a liquid-liquid extraction process as applied to an aromatic-containing stream to produce either a raffinate or extract product of predetermined character. The control of the variables may be effected automatically or manually, but automatic controls are instantaneous and are usually more effective. It is feasible to utilize a probe 64 in each of lines 12, 22, and 54, all of which communicate with a common "Permitor" 62. This instrument then can be connected with a timer which operates the instrument at intervals to take probe readings successively on the various streams. The instrument can then operate a valve or control instrument on any of the process variables, periodically, to control the character of the products of the process.

Referring to FIGURE 4, an alternating current Wheatstone bridge 92 is connected to a source of alternating current 93. A probe 94, comprising a pair of electrodes or spaced conductors, is designed to be inserted into the liquid of which the capacitance is to be determined. Element 95 represents a reference condenser or a probe in a standard liquid. Signals emanating from the Wheatstone bridge are amplified in amplifier 96 and the amplified signals are transmitted to an instrument 97, such as a Brown Recorder, which converts an electrical signal to a pneumatic signal. Air is supplied to instrument 97 via line 98 and the pneumatic signal is transmitted to temperature controller 86 (FIGURE 3) via line 90 and instrument 86 in turn sends out a pneumatic signal which changes the position of valve 84 when conditions are such as to require a change in temperature in the fluid in line 20 which is not within the set range of instrument 86.

As a specific example of an application of the process of the invention to the production of carbon black feedstock, it was desired to maintain the BMCI of the carbon black feed within the narrow range of 89 to 92. The feed to the process, which was operated in accordance with the schematic flow diagram shown in FIGURE 1, was prepared by blending 85.4 liquid volume percent of a heavy-cycle oil and 14.6 liquid volume percent of a decant oil, both oils being recovered from the products of a catalytic cracking process. The following inspection data were obtained when the column was operated with a raffinate temperature of 81° F. and pressure of 48 p.s.i.g. and a solvent temperature of 83° F., a charge temperature of 89° F. and a bottom temperature of 72° F. The feed oil had the following properties:

| | |
|---|---|
| API gravity_____degrees___ | 30.2 |
| Initial boiling point_____degrees F__ | 476 |
| 50% evaporated_____do____ | 634 |
| 90% evaporated_____do____ | 716 |
| End point_____do____ | 773 |
| BMCI _____ | 37.88 |

This oil was charged to extraction tower 10 by way of line 16 at the rate of 13,013 barrels per stream day at 89° F. to produce a raffinate phase removed through line 22 at a rate of 10,500 barrels per day at a temperature of 81° F. This raffinate stream contained 8,810 barrels per stream day of raffinate product and 1,690 barrels per day of liquid sulfur dioxide solvent. The raffinate product was characterized by the following properties:

| | |
|---|---|
| API gravity_____degrees___ | 40.5 |
| Initial boiling point_____degrees F__ | 513 |
| 50% evaporated_____do____ | 637 |
| 90% evaporated_____do____ | 713 |
| End point_____do____ | 767 |
| BMCI _____ | 12.63 |

The extract phase was removed through line 44 at 72° F. at a rate of 13,209 barrels per day and contained 9,106 barrels per day of liquid sulfur dioxide and 4,203 barrels per day of extract product which was characterized by the following inspection data:

| | |
|---|---|
| API gravity_____degrees___ | 12.1 |
| Initial boiling point_____degrees F__ | 461 |
| 50% evaporated_____do____ | 636 |
| 90% evaporated_____do____ | 744 |
| End point_____do____ | 773 |
| BMCI _____ | 89.61 |

The liquid sulfur dioxide solvent was introduced at 83° F. through line 28 at a rate of 10,796 barrels per steam day; thus, a solvent-to-feed ratio of 0.83 barrel of solvent per barrel of feed was maintained. A portion of the extract phase at a rate of 8,856 barrels per stream day was removed by way of line 32 and pump 40 at 75° F. and circulated through chiller 36 via line 38 and control valve 42 to a lower section of the extract phase at a temperature of 69° F. This chilling action served to remove a portion of the least soluble components of the extract phase from the solution and thereby provide a richer extract product and also provide internal reflux for the raffinate phase.

The values given are composite values based on a full months operation, however, the BMCI of the extract product was maintained in the range of 89.0 to 92.0 on all samples measured during the month. Control is accomplished by setting the "Permitor" 62 to hold the capacitance of the extract product flowing through line 54 within the range of 137 to 138 plus or minus 2, mmf. When a reading less than 137 mmf. is obtained thereby indicating a low BMCI, "Permitor" 62 operates to reset temperature-recorder-controller 86 (which is initially set to maintain a solvent temperature of 83 plus or minus one degree F.) so as to decrease the controlled temperature of the solvent. Thereby, the actual solvent temperature is reduced by increasing the rate of flow through valve 84 in cold solvent line 68. When the capacitance of the extract product increases in response to the latter change in solvent temperature, the "Permitor" returns to the desired operating range and resets temperature-recorder-controller 86 to control at its original setting. If the capacitance of the extract product exceeds 138 mmf., the "Permitor" responds in a similar manner by increasing the solvent control temperature by reducing the cold solvent flow rate until the capacitance of the extract product again returns to the desired control range of 137 to 138 mmf.

This specific example serves to show the details of the liquid-liquid extract control step of this invention. It may be utilized to control other operating variables in the process which have been pointed out in the above discussion, by measuring the capacitance of the charge oil, the raffinate product or extract product and utilizing the "Permitor" to override or reset the proper automatic control devices on the affected process streams.

While sulfur dioxide ($SO_2$) is the preferred solvent for the extraction process with which the invention is concerned, other solvents including furfural, ethylene glycol, diethylene glycol, triethylene glycol, propylene glycol, polyethylene glycol, methanol, aniline, phenol, water, and aqueous solutions of most of these solvents are well known solvents for similar extractions.

Certain modifications of the invention will become apparent to those skilled in the art and the illustrative details disclosed are not to be construed as imposing unnecessary limitations on the invention.

I claim:

1. A process for separating a mixed hydrocarbon stream comprising essentially aromatic and non-aromatic hydrocarbons into an aromatics-rich stream and a non-aromatic-rich stream which comprises passing said mixed stream into an intermediate section of an elongated upright liquid-liquid extraction zone; introducing a stream of liquid $SO_2$ into an upper section of said zone and passing same downwardly in countercurrent flow to said hydrocarbon stream so as to produce an extract rich in aromatic hydrocarbons in a lower section of said zone and a raffinate rich in non-aromatic hydrocarbons in an upper section of said zone; maintaining a substantially constant liquid interface level between said extract and lean liquid in a lower section of said zone by controlled withdrawal of an extract stream from the lowermost section of said zone; maintaining a substantially constant vapor-liquid interface level between raffinate and vaporized $SO_2$ in an upper section of said zone by controlled withdrawal of a raffinate stream from an upper section of said zone while withdrawing $SO_2$ vapor from the uppermost section of said zone to maintain constant pressure therein; continuously measuring the capacitance of said extract stream after flashing $SO_2$ therefrom; mixing a cold stream and a warm stream of liquid $SO_2$ to form said stream of liquid $SO_2$; and regulating the temperature of said $SO_2$ stream by varying rate of flow of said cold stream in response to said capacitance so as to produce an extract aromatic stream of predetermined capacitance and BMCI value.

2. The process of claim 1 including the steps of maintaining a cooling zone for solvent separate from said extraction zone; vaporizing $SO_2$ in said cooling zone so as to maintain a temperature therein substantially below the minimum temperature in said extraction zone; passing cooled liquid $SO_2$ from said cooling zone in admixture with warmer $SO_2$ to said extraction zone as said stream of solvent; and regulating the temperature of said stream of solvent by controlling the proportion of said cooled $SO_2$ in the resulting mixed solvent stream in response to variations in said capacitance.

3. Apparatus for liquid-liquid extraction comprising in combination an extraction column having a feed inlet in an intermediate section, a product take-off line in an upper section, a solvent inlet line in an intermediate section, a solvent take-off line in an uppermost section above aforesaid product takeoff line, and a product take-off line in its lowermost section; means for supplying cold solvent and means for supplying warm solvent; separate lines connecting each of aforesaid means with said solvent line; means in said solvent line for maintaining a constant rate of flow therein; a flow-control valve in the cold solvent line leading to said solvent line; a temperature controller responsive to temperature in said solvent line and in actuating communication with said flow-control valve; and means for automatically determining capacitance of a liquid stream connected in the extract effluent line and operatively connected with said flow control valve so as to automatically reset same in response to variations in the capacitance of the extract effluent.

4. The apparatus of claim 3 including a flow control valve in the product take-off line in said upper section; a liquid-level controller sensitive to an interface level in an upper section of said column and in operative control of last said valve; a flow control valve in the product take-off line in said lowermost section; a liquid-level controller sensitive to an interface in said lowermost section and in operative control of last said valve; a solvent chiller comprising an indirect heat exchanger having one section connected by inlet and outlet lines with the lowermost section of said column and a separate section connected with said solvent take-off line and with said cold solvent line; and means for vaporizing solvent from said separate section so as to maintain a selected liquid-level therein.

5. A process for separating a mixed hydrocarbon stream comprising essentially aromatic and non-aromatic hydrocarbons into an aromatics-rich stream and a non-aromatics-rich stream which comprises passing said mixed hydrocarbon stream at a constant rate into an intermediate section of an elongated upright liquid-liquid extraction zone; passing a stream of liquid solvent selective for aromatics into an upper section of said zone at a constant rate so as to effect countercurrent contacting of said streams and extraction of aromatics with said solvent; recovering from an upper section of said zone a raffinate rich in non-aromatics; recovering an extract stream rich in aromatics from a lower section of said zone; maintaining a cooling zone for solvent separate from said extraction zone; vaporizing solvent in said cooling zone so as to maintain a temperature therein substantially below the temperature in said extraction zone; passing cooled liquid solvent from said cooling zone in admixture with warmer liquid solvent to said extraction zone as said stream of solvent; withdrawing an aromatics-rich stream from the lower section of said extraction zone at a constant rate and passing same in indirect heat exchange with the liquid in said cooling zone to cool same below extraction zone temperature; returning the resulting cooled stream to the lower section of said extraction zone so as to further cool the extract phase therein and decrease the solubility of non-aromatic hydrocarbons in said phase to release same to the raffinate phase; at least periodically measuring the capacitance of said extract stream; and regulating the temperature in said extraction zone by controlling the proportion of cooled solvent in said stream of solvent in response to variations in said capacitance to obtain an extract stream of the desired aromatic content.

6. The process of claim 5 wherein said solvent is $SO_2$.

References Cited in the file of this patent
UNITED STATES PATENTS

| | | |
|---|---|---|
| 2,336,205 | Willauer | Dec. 7, 1943 |
| 2,401,852 | Arnold et al. | June 11, 1946 |
| 2,623,928 | Bower | Dec. 30, 1952 |
| 2,654,067 | Bruce | Sept. 29, 1953 |
| 2,654,792 | Gilmore | Oct. 6, 1953 |
| 2,737,469 | Anderson et al. | Mar. 6, 1956 |
| 2,764,522 | Hettick | Sept. 25, 1956 |
| 2,768,129 | Knox | Oct. 23, 1956 |

OTHER REFERENCES

Kalichevsky: "Modern Methods of Refining Lubricating Oils" (1938), Reinhold Publishing Corp., 330 W. 43rd St., New York, N.Y., pages 110–111.

Petroleum Refiner vol. 30 (1951), pages 237–8.

Thomas et al.: "Analytical Chemistry," vol. 23, pages 1750–4, December 1951.

Wilkinson et al.: "Petroleum Engineer," vol. 25, July 1953, pages C–3 to C–6.

Hodgmen et al.: "Handbook of Chemistry and Physics," 35th edition (1954), pages 2324–5, Chemical Rubber Publishing Co., 2310 Superior Ave., N.E., Cleveland, Ohio.